United States Patent [19]

Kemp et al.

[11] Patent Number: 5,547,000

[45] Date of Patent: Aug. 20, 1996

[54] METHOD AND APPARATUS FOR COLOR MATCHING OF SILICONE SEALANTS

[75] Inventors: Daniel N. Kemp; Timothy W. Mitin; Kenneth J. Rohman; Christopher C. Shirk, all of Midland; Ronald W. Wieck, Bay City, all of Mich.

[73] Assignee: Dow Corning Corporation, Midland, Mich.

[21] Appl. No.: 364,352

[22] Filed: Dec. 27, 1994

[51] Int. Cl.[6] .................................. B65B 1/04; B65B 3/04
[52] U.S. Cl. .................................. 141/104.000; 141/105; 141/25; 141/9; 141/248; 222/136
[58] Field of Search .......................... 141/2, 9, 18, 21, 141/25, 26, 27, 67, 104, 105, 107, 248; 222/253, 249, 250, 275, 276, 136; 417/419, 521

[56] References Cited

U.S. PATENT DOCUMENTS

| | | | |
|---|---|---|---|
| 4,279,360 | 7/1981 | Hauser | 22/250 |
| 4,457,348 | 7/1984 | Mueller et al. | 141/25 |
| 5,119,973 | 6/1992 | Miller et al. | 141/104 |
| 5,332,313 | 7/1994 | Cimbalik et al. | 366/303 |

*Primary Examiner*—Henry J. Recla
*Assistant Examiner*—Steven O. Douglas
*Attorney, Agent, or Firm*—James L. DeCesare

[57] ABSTRACT

Colored silicone sealant are made in an apparatus by (i) programming a central computer to control the operation of a mixing device and a plurality of dosing units actuated by a ball screw table/servo-motor mechanism; (ii) supplying sealant base and pigments to the dosing units; (iii) activating the ball screw table/servo-motor mechanism in response to signals from the computer; (iv) metering predetermined volumes of sealant base and pigments at a predetermined rate; (v) conveying metered portions to the mixing device; and (vi) dispensing colored silicone sealant into a cartridge.

11 Claims, 3 Drawing Sheets

METHOD AND APPARATUS FOR COLOR MATCHING OF SILICONE SEALANTS

BACKGROUND OF THE INVENTION

This invention is directed to sealants, and more particularly to a method and an apparatus capable of producing custom-colored silicone sealants.

Silicone sealants typically contain a polydiorganosiloxane, a filler, a cross-linker, and a curing catalyst. These silicone sealants cure by exposure to moisture, and are viscous materials which can be extruded from cartridges into cracks or crevices to be sealed. The consistency of a sealant is viscous and toothpaste-like. In applications such as building construction, sealants are thixotropic and non-sagging in order to remain in place until cured. Because silicone sealants are used in building construction, aesthetics such as color are important. Therefore, silicone sealants of a variety of colors are needed commercially, and matching colors for specific building materials can often be a problem.

Silicone sealants are made by mixing various ingredients in predetermined defined weight or volume ratios. For room temperature vulcanizable silicone sealants (RTV), polydiorganosiloxanes are end-blocked with silanol or other appropriate hydrolyzable groups. These polydiorganosiloxanes typically have viscosities in excess of one Pa.s (1,000 centistoke) measured at 25° C., preferably 1 to 100 Pa.s (100,000 centistoke). When a filler is added to the polydiorganosiloxane, the mixture is called a "sealant base", since it constitutes the major portion of the sealant, and because other ingredients are added to arrive at a final composition. Useful fillers are (i) reinforcing fillers such as silica, carbon black, and finely divided calcium carbonates; and (ii) non-reinforcing or extending fillers such as titanium dioxide, quartz, diatomaceous earth, and alumina.

To the "sealant base", cross-linking agents and catalysts are added. The cross-linking agents are generally silanes or partial hydrolysis products of silanes. These silanes include acetoxysilanes, alkoxysilanes, ketoximosilanes, aminosilanes, and amidosilanes. The cross-linking silanes have three to four hydrolyzable groups per molecule, while the partial hydrolysis products have more than three. In addition to cross-linking agents, sealants include chain-extending agents which are also silanes but with only two hydrolyzable groups per molecule. The hydrolyzable group terminating the polydiorganosiloxane is often the same as the group of the silane cross-linking agent, but mixtures of different types of hydrolyzable groups can be present in the same sealant composition.

Catalysts for curing the sealant compositions are dependent upon the type of cross-linking agent, and include compounds such as metal carboxylates, alkyl orthotitanates, titanate chelates, and zirconium alkoxides and chelates.

Since the polydiorganosiloxane in the sealant base is clear and colorless, coloring agents are added. While sealants can be clear, they are usually produced in five to eight standard colors, including black, white, and various tones of beige, brown, or gray. Virtually any color or hue is possible, subject to the reproducibility of the pigment, the exactness of metering, and the thoroughness of mixing. These coloring agents, commonly called pigments, include various categories of inorganic and organic pigments.

For example, the most important inorganic coloring agents employed in sealants are derived from iron oxide pigments, such as the yellow, brown, red, and black, iron oxides. Other synthetic inorganic pigments include for example, cadmium orange, chromium oxide green, manganese violet, and molybdate orange. Typical of numerous varieties of organic synthetic coloring agents for sealants are Acid Red 52, Benzidine Yellow HR, Methyl Violet, Phthalocyanine Green and Blue, Pigment Brown 28, and Victoria Blue B.

To facilitate processing, the coloring agent is added to the "sealant base" in the liquid state. These pigment dispersions, color concentrates, and liquid colorants, are achieved by dispersing a pigment in a liquid carrier.

In the past, processes for coloring sealants have been complicated by the fact that frequent changeovers from color to color are required. Thus, the "sealant base" was compounded, catalyzed, and packaged in drums or bulk containers. The containers were moved to a separate color production process area for pigmentation. Many different color pigments are needed to make the variety of colors and shades required in the market place. Therefore, matching a particular color would often require sophisticated blending of a number of pigments.

Typically, production personnel loaded the "sealant base" into a large mixer, and metered the necessary coloring agent into the mixer to produce the colored sealant. The ingredients were mixed for a period of time, and inspected for color match using standard colorimetry technology. The addition of the pigment had to be carefully controlled, because pigments can cause degradation of the physical properties of the sealant, if the amount of pigment exceeds certain concentration levels. When the color of the sealant was determined to be correct, the sealant was then moved to a proportioning machine where the sealant was dosed into cartridges, drums, or pails, in a one-part volumetric dosing system.

The problem to be solved by the present invention involves the simplification of these complicated prior procedures, and the problem has been solved according to the invention, by the provision of a new automated "hands-off", "on-line", apparatus and method, for producing color matched silicone sealants on demand.

SUMMARY OF THE INVENTION

It is therefore an object of the invention to provide a new combination of elements, embodied in an apparatus which includes a central control computer, a ball screw table/servomotor mechanism, and a mixing device.

It is also an object of the invention to utilize this new combination of elements in a fashion so that it will supply, feed, measure, meter, and mix, a plurality of different ingredients, necessary to form a tailored product, meeting a predetermined criteria of material content and color hue.

According to the invention, the method involves selection of discrete volumetric doses of sealant base and discrete volumetric doses of one or more pigments, and feeding those doses into a mixing device. The dose of sealant base and pigment are in a ratio to provide a predetermined color property in the homogeneous mixture. The mixed and homogeneous mixture is then dispensed into a suitable receptacle, such as a cartridge, drum, or pail.

Dosing is accomplished by the interaction of a ball screw table/servo-motor mechanism which cooperates with a pair of opposing dosing cylinders. A central control computer is programmed to set stroke lengths for the ball screw table mechanism to deliver a predetermined volume of the mixture at a predetermined rate.

In essence then, the invention is directed to a method of making a colored silicone sealant by (i) programming a computer to control the operation of a mixing device, and a plurality of dosing units each having a pair of opposing cylinders with a metering chamber actuated by a ball screw table/servo-motor mechanism, (ii) supplying sealant base and pigments to individual ones of the dosing units and feeding sealant base and pigments to the metering chamber in only one cylinder in each dosing unit pair, (iii) activating the ball screw table/servo-motor mechanism of each dosing unit in response to signals from the computer to meter from the metering chamber a predetermined volume of sealant base and pigment at a predetermined rate, (iv) simultaneously with step (iii) filling the metering chamber in the other cylinder of each dosing unit with the same material metered from the opposing cylinder of the pair, (v) conveying metered portions of sealant base and pigment from individual dosing units to the mixing device, (vi) mixing the sealant base and pigments in the mixing device, and (vii) dispensing colored silicone sealant into a cartridge, pail, or drum.

Apparatus according to the invention for carrying out this method includes (i) a mixing device; (ii) a plurality of dosing units each having a pair of opposing cylinders with a metering chamber; (iii) a ball screw table/servo-motor mechanism for actuating the cylinders; (iv) a computer programmed to control the operation of the mixing device, the dosing units, and the ball screw table/servo-motor mechanism; (v) means for supplying silicone sealant base and pigments to individual ones of the dosing units, (vi) means for feeding silicone sealant base and pigments into the metering chamber in only one cylinder of each dosing unit; (vii) means for activating the ball screw table/servo-motor mechanism of each dosing unit in response to signals from the computer to meter from the metering chamber a predetermined volume of silicone sealant base and pigment at a predetermined rate; (viii) control valve means enabling simultaneous filling of the metering chamber in the other cylinder with the same material metered from the opposing cylinder of the pair; (ix) means for conveying metered portions of silicone sealant base and pigment from individual dosing units to the mixing device; and (x) means for dispensing colored silicone sealant from the mixing device into a suitable cartridge, pail, or drum.

These and other features and objects of the invention will become more apparent from a consideration of the detailed description.

DETAILED DESCRIPTION OF THE INVENTION

The apparatus of the invention is designed for dosing, mixing, and packaging, custom-colored silicone sealants, in one operation. The apparatus preferably consists of two "sealant base" dosing units and ten pigment dosing units; although the apparatus could be designed to accommodate any number of sealant base dosing units and pigment dosing units.

Figure 1:
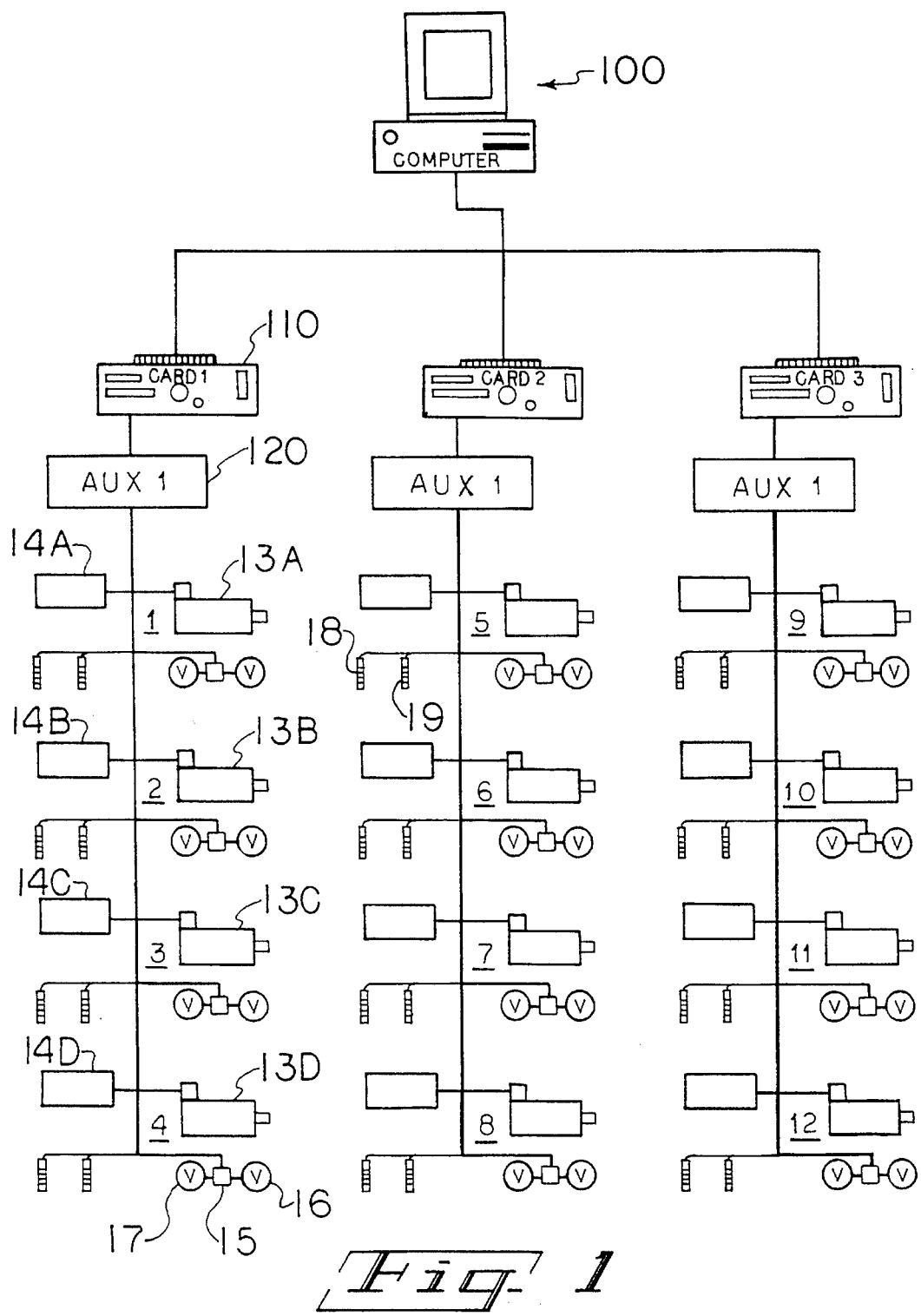
FIG. 1 is a simplified schematic and functional representation of basic components of a computer hardware system embodying the concept of the present invention.
Figure 2:
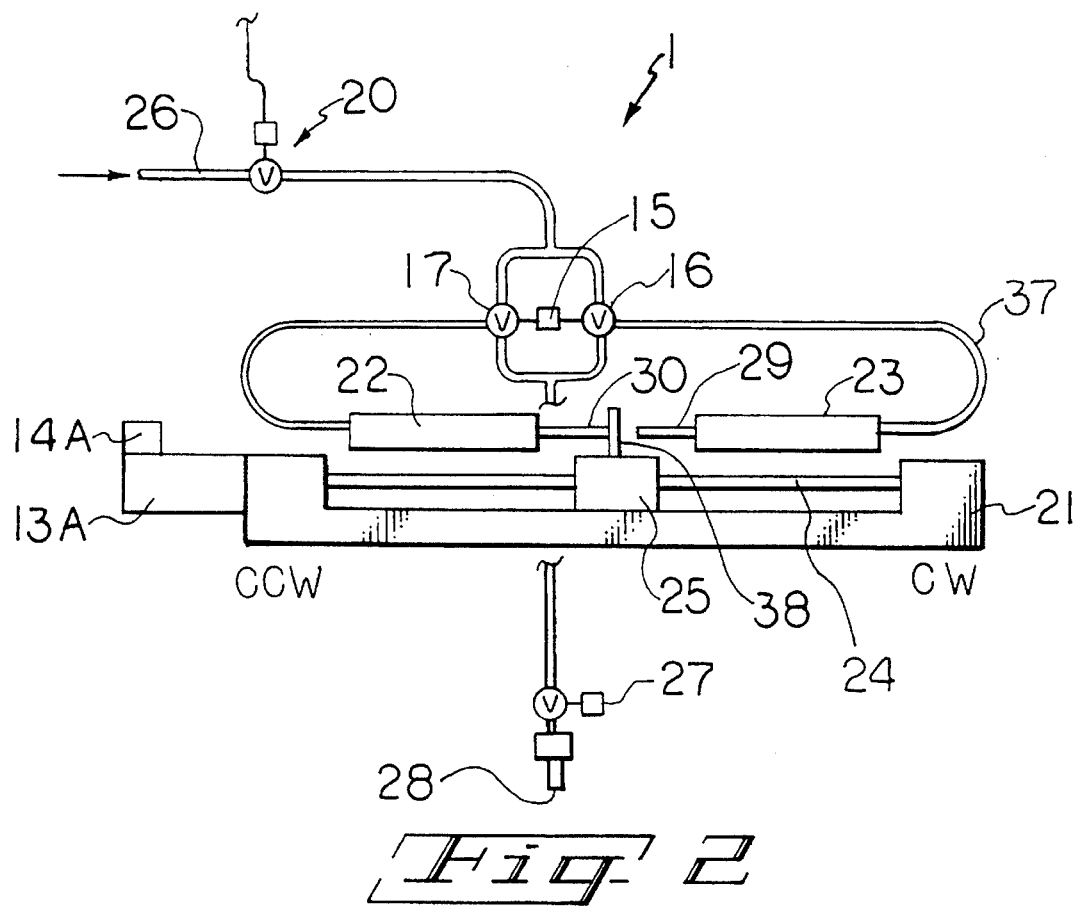
FIG. 2 is a simplified pictorial representation of basic components of a feeding and metering system embodying the concept of the present invention. This feeding and metering system is one of twelve feeding and metering systems controlled by the computer hardware system shown in FIG. 1.
Figure 4:
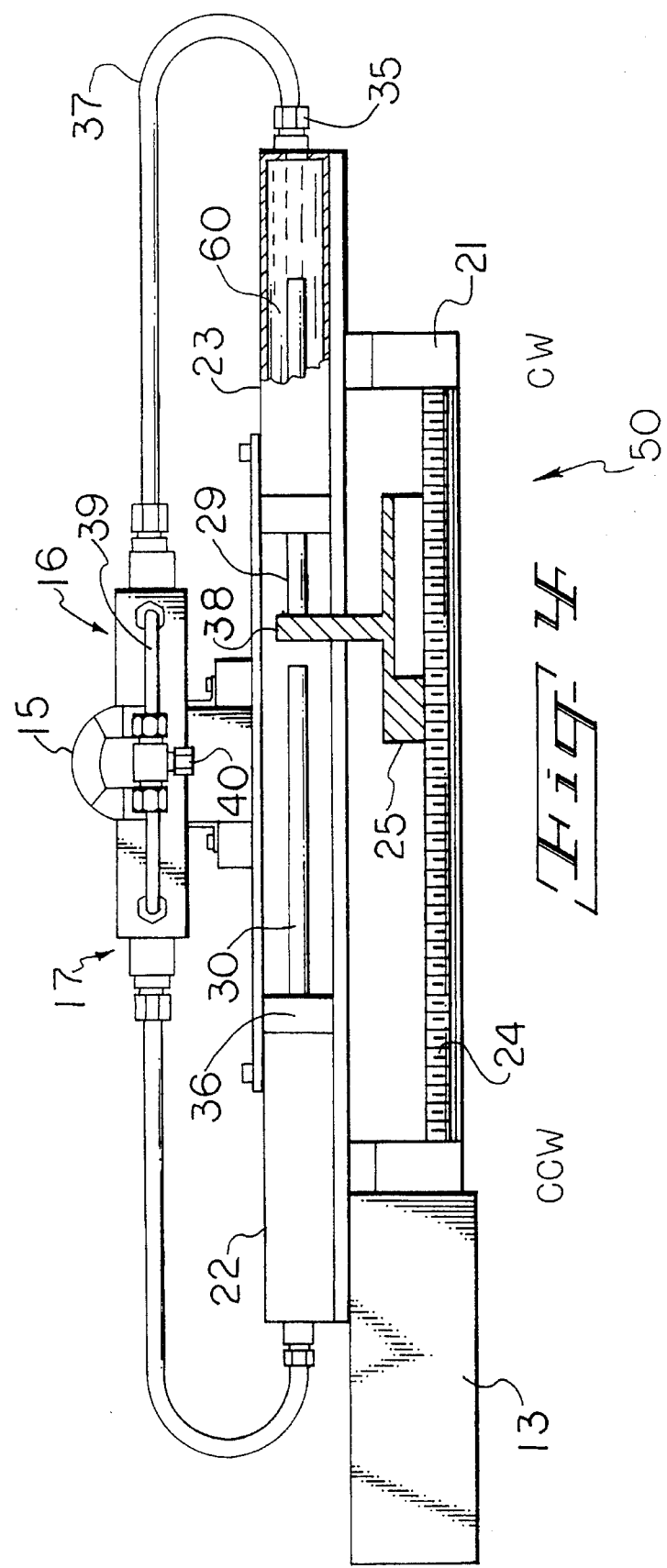
FIG. 4 is a more detailed but simplified pictorial representation, partly in cross-section, of the basic components of the feeding and metering system generally shown in FIG. 2.

For the purpose of illustrating the invention, two sealant base dosing units 1 and 2 are shown in FIG. 1, along with ten pigment dosing units 3–12. The structural details of these twelve dosing units is similar, and therefore in the interest of simplicity, only the details of one dosing unit 1 representative of the twelve is shown in FIGS. 2 and 4.

Figure 3:
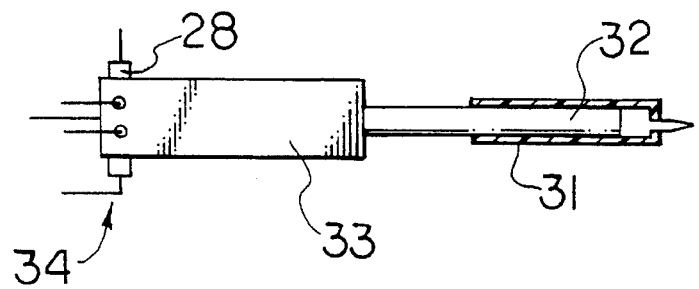
FIG. 3 is a simplified pictorial representation of basic components of a mixing device embodying the concept of the present invention. This mixing device receives twelve inputs from the outputs of the twelve feeding and metering systems shown in FIGS. 1 and 2.

An output from each dosing unit 3–12 takes the form of an injector 28 adapted for connection to the input of a mixing device 33 shown in FIG. 3. It is preferred to use a mixing device such as shown in U.S. Pat. No. 5,332,313 issued Jul. 26, 1994, which is assigned to the same assignee as the present application; although any type of mixing device could be used.

However, the mixing device in U.S. Pat. No. 5,332,313 is particularly effective for silicone sealants. Band includes a hollow chamber housing a central drive shaft. The central drive shaft contains a plurality of upstanding offset moving pins, while the interior wall of chamber has a plurality of inward projecting stationary pins. The combination and cooperation between the moving pins on the central driven shaft and the stationary pins projecting from the chamber wall results in materials being effectively mixed by a folding action as the materials pass through the mixing device.

Each dosing unit 1–12 dispenses a predetermined and controlled volume of material into the mixing device 33 at a predetermined rate, at a ratio which can be pre-selected and in response to signals from the central computer control system 100 depicted in FIG. 1. The mixing device 33 in turn disperses one or more of the pigments from dosing units 3–12 into a sealant base from either dosing unit 1 or 2, and fills a manually placed 10.3 ounce cartridge 31 with the sealant.

The apparatus can be programmed to fill pails or drums, rather than filling cartridges. In any case, for purposes of the invention, it is sufficient that a suitable mixing device 33 be provided which includes a filling nozzle 32 for receiving a sealant cartridge 31, and an injector ring 34 for receiving the several outputs 28 from the individual ones of the dosing units 3–12. Sealant base dosing units 1 and 2 preferably feed to the rear of the mixing device 33 at a convenient approach angle.

The sealant base and pigments are supplied to the apparatus from drums which are equipped with a pump for conveying the materials to feed lines 26 shown in FIG. 2. Each feed line 26 includes an automatically actuated and computer controlled two-way valve 20. The two-way valve 20 allows flow of a material into a dosing unit at the proper time in response to command signals from the central computer control system 100.

With reference to FIGS. 2 and 4, each dosing unit 1–12 dispenses the correct amount of material (sealant base or pigment) at a predetermined rate into the mixing device 33 via two opposing cylinders 22 and 23. Cylinders 22 and 23 are connected to and adapted to be actuated by a ball screw table/servo-motor mechanism 50 shown in detail in FIG. 4. Cylinders 22 and 23 are controlled such that as one cylinder is filling with a material, the other opposing cylinder is simultaneously evacuating and expelling a metered predetermined volume of the same material at a predetermined rate.

The precise amount of material supplied to or expelled from cylinders 22 and 23 is controlled by movement of a shuttle assembly 25. The shuttle assembly 25 is a component of a ball screw table/servo-motor mechanism 50 shown generally in FIG. 2 but in more detail in FIG. 4. Motion profiles are defined as the shape of the velocity versus time curve for each dispense cycle. The profiles are calculated for each color combination. These profiles are based on three independent variables: stroke, which is calculated from the VOLUME of each component of each color formulation, TIME of acceleration/deceleration, and total dispense cycle TIME. All other metering/dispense parameters are based on these three variables, and are: acceleration, deceleration, and velocity. Motion profiles are stored and used as the basis of signals from the central computer control 100, for actuating the ball screw table/servo-motor mechanism 50.

The pumping action produced by the dosing units 1–12 pushes materials from cylinders 22 or 23 into and through mixing device 33, which in turn disperses materials and fills a sealant cartridge 31. One cycle or stroke of the apparatus produces one full cartridge of sealant. All valve switching, motion of dosing units 1–12, and functioning of mixing device 33, are in response to signals from the central computer control system 100.

In FIG. 1, the central computer control system 100 for the apparatus is depicted as an AT6400 process controller available from PARKER COMPUMOTOR, Rhonert Park, Calif., U.S.A. The AT6400 system 100 is designed to control the motion of servo-motors 13 A–D through servo-motor drive signals 14 A–D, and to control digital outputs such as actuators 15 of the three-way ball valves 16 and 17. In addition, the AT6400 system receives digital inputs such as proximity switches 18 and 19 used to activate and verify different overall apparatus events.

The AT6400 system consists of three printed circuit cards 110 which plug into an IBM compatible computer 100. Each printed circuit card 110 has the ability to control four servo-motors 13A, 13B, 13C, and 13D; twenty-four (24) outputs; and twenty-four (24) inputs. The three printed circuit cards 110 are hard-wired to an auxiliary connector board 120 ("AUX 1"), which serves as a connection point for the various inputs, outputs, and drives of the servo-motors.

The printed circuit cards 110 are each designed to run independent programs in the computer 100, but the printed circuit cards 110 are interconnected through three dedicated inputs and two dedicated outputs, in order to function together. The printed circuit cards 110 run a series of programs written and programmed for the apparatus, and these programs are used to control the specific order, timing, and coordination of the events, necessary to complete each cycle of the apparatus. Programming the computer to carry out a particular sequence of events can be implemented by one having ordinary skill in the art.

In order to simplify the operation of the apparatus, however, an operator interface is written by the programmer who programs the computer. The operator interface is designed to provide a "user-friendly" means to download, supply variables, and initiate the AT6400 programs. Programming of the computer also includes the provision of various reference documents for the control system hardware; the input/output (I/O) protocols and definitions; a listing of software files necessary to run the apparatus; and the specific codes and functions of each program. Preferably, the operator interface program is written to provide a "user-friendly" method for entering data into the apparatus. The program should be totally menu driven and self-explanatory with regard to options and functions. Each screens as it appears on the computer should contain sufficient information on how to enter data on the screen.

In FIG. 1, since each bank of the three printed circuit cards 110 is identical, not all of the components of the system have been identified with reference characters. However, parts identified with reference characters in one card bank are the same or substantially the same as unidentified parts in one of the other card banks. The number of dosing units to be controlled by the cards 110 will depend upon the number of iterations of color matching and hues desired for custom-designing sealants.

In FIGS. 2 and 4, each dosing unit 1–12 has a frame 21 supporting a ball screw in the form of a worm gear 24. A two-way valve 27 is included in the injector outlet line 28 from the dosing unit, and the valve 27 is used to provide additional control in feeding materials from cylinders 22 and 23 into injector 28. Cylinders 22 and 23 contain rods 29 and 30 which perform the function of a piston in expelling the contents in the cylinders 22 and 23. Rods 29 and 30 are supported within each cylinder by a cylinder seal 36. Rods 29 and 30 have one portion extending outside the cylinder and a second portion inside the metering chamber 60 of the cylinder.

Movement of rods 29 and 30 is used to expel the contents of chambers 60, and to control the exact amount of material metered from cylinders 23 and 22, respectively. Thus, when rod 29 is in a position occupying for example 8 cubic inches of volume in cylinder 23 (chamber 60), and rod 29 is moved right-ward to another position occupying 10 cubic inches of volume, then two cubic inches of material in cylinder 23 (chamber 60) are metered into an outlet tubing 37 connected to cylinder 23 by coupling 35. Additional outlet lines 39 from valves 16 and 17 in each dosing unit direct the flow of material through an appropriate outlet port 40 and into injector 28. By sequentially manipulating three-way valves 16 and 17, cylinder 22 can be filled, while at the same time cylinder 23 can be emptying.

In FIG. 4, shuttle assembly 25 is mounted for movement on ball screw 24, and has an upstanding shuttle finger 38. Finger 38 extends upwardly from assembly 25 and terminates at a point spaced between one end of rods 29 and 30. Neither of rods 29 and 30 nor finger 38 are connected to one another however. While finger 38 is capable of positively displacing and moving either rod 29 or 30, finger 38 cannot pull either rod backward from the position to which the rod was moved. Rods 29 and 30 are moved backward not by finger 38 but by fluid pressure maintained in tubing 37 during a filling sequence. Preferably, the proximity switches 18 and 19 shown in Figure I are mounted on shuttle assembly 25 above rods 29 and 30; one proximity switch being located on each side of finger 38.

The shuttle assembly 25 cooperates with ball screw 24 for forward and backward movement in response to servo-motor 13. Ball screws are known in the mechanical arts, and consist of three components, namely; (i) a screw which is cut with a circular form thread at a particular helix angle; (ii) a nut with an internally cut circular-form thread of the same helix angle; and (iii) a series of balls that fit the helical path made by the nut and the screw.

The motion of a ball screw assembly is the same as that of an ordinary nut and screw, except for substitution of rolling friction of balls for sliding friction of threads. Such assemblies are used when rotating motion must be converted to 1 i near motion, or where linear motion must be changed to rotary motion with high transmissive efficiency.

In FIG. 4, rotary movement of servo-motor 13 is converted to linear movement of finger 38 by ball screw 24, which functions as the screw, while shuttle assembly 25 functions as the nut, in other words. Such ball screw table assemblies are advantageous in having (i) an efficiency of over 90 percent, (ii) a low starting torque which permits use of smaller servo-motors, and (iii) a smooth movement because of rolling friction. Ball screw table assemblies are commercially available from manufacturers such as THOMSON INCORPORATED, Port Washington, N.Y., U.S.A.

Servo-motors 13 are known in the electro-mechanical arts, and with the aid of a regulator, such motors can be controlled so that rotation can be provided in any desired direction at controlled accelerations and velocities, and any number of revolutions or parts of revolutions. Such servo-motors are available commercially from manufacturers such as PARKER COMPUMOTOR, Rhonert Park, Calif.,U.S.A.

By the interaction of servo-motor 13, ball screw 24, and shuttle assembly 25, fingers 38 of dosing units 1–12 can be varied within wide limits as far as concerns their acceleration, velocity, and position. Fingers 38 can also have in addition, a completely individual movement pattern controlled by the data program in the central computer system 100. Computer 100 is programmed such that the first event that happens after issuance of any run command is a "homing" of each dosing unit 1–12. In the "homing" routine, shuttle assemblies 25 are caused to assume a center or "home" position, from which the fingers 38 can be moved the correct distance for a desired stroke.

In one example of a practical application of the apparatus, a color chip to be matched is analyzed in a colorimeter. The colorimeter data is used to calculate an exact amount of sealant base and pigment or pigments necessary to match the color. An analysis may reveal, for example, that a color match requires 98% of a sealant base, 1.5% of red pigment, 0.3% of yellow pigment, and 0.2% of brown pigment. This information is loaded into the central computer control system 100 which calculates a cylinder volume displacement necessary to achieve the color match, using specific gravities of the ingredients. In the example, the sealant base may have a specific gravity of 1.510; the red pigment 1.670; the yellow pigment 2.750; and the brown pigment 1.230. The computer converts volume displacement into inches of travel of shuttle assembly 25, and then calculates the linear motion parameters which are converted into rotational parameters and used to control the rotation of servo-motor 13.

The correct amount of sealant base may require 7 inches (17.78 cm) of travel of shuttle assembly 25, or the equivalent of 36.5 rotations of servo-motor 13; the correct amount of red pigment may require 1.5 inches (3.81 cm) of travel of shuttle assembly 25, or the equivalent of 10.0 rotations of servo-motor 13; the correct amount of yellow pigment may require 0.5 inches (1.27 cm) of travel of shuttle assembly 25, or the equivalent of 2.0 rotations of servo-motor 13; and the correct amount of brown pigment may require 0.07 inches (0.1778 cm) of travel of shuttle assembly 25, or the equivalent of 0.4 rotations of servo-motor 13.

It is then simply a matter of initiating a program, supplying materials from drums, pumping materials into "homed" dosing units, and allowing the programmed run to complete a cycle. The cycle pattern is repeated each time a cartridge is filled.

In a preferred embodiment, the computer 100 is adapted to coordinate the rate of motion of each shuttle assembly 25 of the several dosing units 1–12, so that the motion of each shuttle assembly 25 is initiated and uniformly completed over the same time period. In this manner, the instantaneous ratio of sealant base to pigment is always the same, regardless of the length of travel of individual shuttle assemblies 25, the stroke of rods 29 and 30, or the volume dispensed. This embodiment provides for maximum uniformity of color, and minimizes the extent of mixing required in the mixing device 33.

Software for the central control computer 100 can be tailored to provide various operator-type interfaces such as SETUP AND RUN, CREATE A COLOR FORMULATION, MATERIALS PROPERTIES, and DIAGNOSTICS; in conjunction with system software such as DOSING UNIT CONTROL, and MOTION PROFILES.

In a given scenario, (i) dosing unit stroke and "go" commands are issued from the operator interface; (ii) control parameters and machine state are initialized; (iii) a bit manipulation subroutine sets up variables for input and output conditions depending on the dosing units being used; (iv) a "homing" subroutine positions the needed dosing units at their zero position; and (v) a move parameter calculation subroutine calculates the accelerations and velocities depending upon the dosing unit strokes.

The system then proceeds to (i) wait for a cartridge start cycle to begin; (ii) positions three-way valves 16 and 17 for a clockwise (CW) move or to the right as seen in the drawings, and waits for feedback from three-way valves 16 and 17; (iii) waits for all three printed circuit cards 110 to ready for move; (iv) opens two-way valves 20 and injector valves 27; (v) dispenses in a clockwise mode, and fills in a counter-clockwise (CCW) mode or to the left as seen in the drawings; and (vi) closes injector valves 27, waits for all dosing units to refill, and closes two-way valves 20.

Thus, in FIG. 2 and by way of example, material from a drum (not shown) is pumped into feed line 26 with two-way valve 20 in the open position. At the same time, three-way valve 17 is positioned to allow flow of material into metering chamber 60 of the left-hand cylinder 22, while three-way valve 16 is positioned to allow flow of material out from metering chamber 60 of the opposing right-hand cylinder 23 and into injector 28. The flow of material out of metering chamber 60 of the right-hand cylinder 23 is brought about by the positive movement of shuttle finger 38 on shuttle assembly 25 against one end of rod 29.

However, it is only required to maintain fluid pressure in line 26 at a level sufficient to force the corresponding and opposing rod 30 to the right as seen in FIG. 2. Since shuttle finger 38 is not connected to either rod 29 or 30, it is free to move back and forth between the rod ends.

This scenario is reversed and repeated simply by a reversal in the position of three-way valves 16 and 17, and a reversal in direction of travel of shuttle assembly 25 along ball screw 24. At any given time, at least one metering chamber in a cylinder will be filling while at the same time the corresponding metering chamber of the other cylinder will be emptying.

Other variations and modifications may be made in the apparatus and method described without departing from the essential features of the invention. The forms of the invention described are only exemplary and not intended as limitations on the scope of the invention defined in the claims.

That which is claimed is:

1. A method of making a colored sealant comprising (i) programming a computer to control the operation of a mixing device, and a plurality of dosing units each having a pair of opposing cylinders containing a metering chamber with expelling means actuated by a ball screw table/servo-motor mechanism for expelling a measured volume of the metering chamber contents at a predetermined rate; (ii) supplying a sealant base and coloring agents to individual dosing units, and feeding the sealant base and coloring agents into the metering chamber in only one cylinder of each dosing unit; (iii) activating the ball screw table/servo-motor mechanism of each dosing unit in response to signals from the computer to meter from the metering chambers a predetermined volume of sealant base and coloring agents; (iv) simultaneously with step (iii) filling the metering chamber in the other cylinder in each dosing unit with the same material metered from the opposing cylinder of the pair; (v) feeding the metered volumes of sealant base and coloring agents from individual dosing units to the mixing device; (vi) mixing the sealant base and the coloring agents in the mixing device; and (vii) dispensing colored sealant into a cartridge.

2. A method according to claim 1 in which the metering in step (iii) is in response to signals from the computer based on volume displacement of the metering chamber and time to dispense, which determine the linear parameters of motion which are converted into rotational parameters used by the servo-motors.

3. A method according to claim 2 in which the sealant base is a mixture of a filler, and a silanol end-blocked polydiorganosiloxane having a viscosity greater than 1 Pa.s.

4. A method according to claim 3 in which the coloring agent is dispersed in a liquid carrier and is selected from the group consisting of pigment dispersions, color concentrates, and liquid colorants.

5. Apparatus for making colored sealants comprising (i) a mixing device; (ii) a plurality of dosing units with each dosing unit comprised of a pair of opposing cylinders each containing a metering chamber, a means for expelling a measure volume of the metering chamber contents, and a ball screw table/servo-motor mechanism associated with each dosing unit for actuating the expelling means; (iii) a computer programmed to control the operation of the mixing device and the dosing units; (iv) means for supplying a sealant or sealant base alternatingly to the two cylinders of at least one of the dosing units, enabling the simultaneous filling of one metering chamber while expelling from the other metering chamber the same sealant or sealant base; (v) a plurality of means for independently supplying pigments alternatingly to the two cylinders of at least two of the dosing units, enabling the simultaneous filling of one metering chamber of each dosing unit while expelling the same pigment from the other metering chamber of that dosing unit; (vi) for each dosing unit, a means for conveying metered portions of the expelled contents of the metering chamber from the dosing unit to the mixing device; and (vii) means for dispensing colored sealant from the mixing device into a cartridge.

6. Apparatus according to claim 5 in which the computer is programmed to control metering in response to signals based on volume displacement of the metering chamber and time to dispense, which determine the linear parameters of motion which are converted into rotational parameters used by the servo-motors.

7. Apparatus according to claim 6 in which the ball screw table/servo-motor mechanism includes a shuttle assembly arranged to travel along a ball screw, the shuttle assembly carrying an upwardly extending shuttle finger which can be positioned between the pair of cylinders of each dosing unit, each cylinder having a rod projecting from one end and terminating at a point adjacent but not connected to the finger.

8. Apparatus for making colored sealants comprising (i) a mixing device; (ii) a plurality of dosing units having a pair of opposing cylinders each forming a metering chamber; (iii) a ball screw table/servo-motor mechanism associated with dosing unit for actuating the cylinders to expel the contents therefrom; (iv) a computer programmed to control the operation of the mixing device, the dosing units, and the ball screw table/servo-motor mechanisms; (v) means for supplying a sealant base and pigments to individual ones of the dosing units, (vi) means for feeding the sealant base and pigments into the metering chamber in only one cylinder in each dosing unit; (vii) means for activating the ball screw table/servo-motor mechanism of each dosing unit in response to signals from the computer to meter from the metering chambers a predetermined volume of sealant base and pigment at a predetermined rate; (viii) control valve means enabling the simultaneous filling of the metering chamber in the other cylinder with the same material being metered from the opposing cylinder of the pairs of opposing cylinders of each dosing unit; (ix) means for conveying metered portions of silicone sealant base and pigments from individual dosing units to the mixing device, and (x) means for dispensing colored sealant from the mixing device into a cartridge.

9. Apparatus according to claim 8 in which the computer is programmed to control metering in response to signals based on volume displacement of the metering chamber and time to dispense, which determine the linear parameters of motion which are converted into rotational parameters used by the servo-motors.

10. Apparatus according to claim 9 in which the ball screw table/servo-motor mechanism includes a shuttle assembly arranged to travel along a ball screw, the shuttle assembly carrying an upwardly extending shuttle finger which can be positioned between the pair of cylinders of each dosing unit, each cylinder having a rod projecting from one end and terminating at a point adjacent but not connected to the finger.

11. Apparatus according to claim 10 in which the computer is adapted to coordinate the rate of motion of each shuttle assembly of the dosing units so that the motion of each shuttle assembly is initiated and uniformly completed over the same time period, whereby the instantaneous ratio of sealant base to pigment is always the same regardless of the length of travel of each shuttle assembly.

* * * * *